(12) United States Patent
Morton et al.

(10) Patent No.: US 7,325,328 B1
(45) Date of Patent: Feb. 5, 2008

(54) METHODS AND APPARATUS TO DETERMINE VESSEL DRAFT AND AMOUNT OF CARGO LOADED IN A VESSEL

(76) Inventors: Paul E. Morton, 6048 Chandler Dr., Baton Rouge, LA (US) 70808; John C. Crane, 1088 Oak Hills Pkwy., Baton Rouge, LA (US) 70810; Mike M. Asoodeh, 42716 Hinson Rd., Hammond, LA (US) 70403; Matthew R. Magnuson, 7335 Conestoga Dr., Greenwell Springs, LA (US) 70739

( * ) Notice: Subject to any disclaimer, the term of this patent is extended or adjusted under 35 U.S.C. 154(b) by 7 days.

(21) Appl. No.: 11/536,575

(22) Filed: Sep. 28, 2006

(51) Int. Cl.
*G01B 7/14* (2006.01)

(52) U.S. Cl. .................................. 33/713; 702/159

(58) Field of Classification Search ................. 33/713, 33/714, 716, 719; 367/99, 107, 118, 908; 702/159, 166, 174
See application file for complete search history.

(56) References Cited

U.S. PATENT DOCUMENTS

| | | | | |
|---|---|---|---|---|
| 3,423,673 | A * | 1/1969 | Bailey et al. | 367/118 |
| 5,077,700 | A * | 12/1991 | Shaw et al. | 367/90 |
| 5,547,327 | A | 8/1996 | Bachalo et al. | |
| 6,249,244 | B1 * | 6/2001 | Heidecke | 367/908 |
| 6,347,461 | B1 * | 2/2002 | Rodriguez et al. | 33/717 |
| 6,750,815 | B2 * | 6/2004 | Michaelson et al. | 367/909 |
| 6,836,746 | B2 | 12/2004 | Coder et al. | |
| 2004/0003958 | A1 * | 1/2004 | Fujimoto et al. | 367/97 |
| 2005/0281134 | A1 * | 12/2005 | Ferreira | 367/908 |

\* cited by examiner

Primary Examiner—G. Bradley Bennett
(74) Attorney, Agent, or Firm—Roy, Kiesel, et al

(57) ABSTRACT

The present invention discloses the methods and apparatus to acquire, record, and analyze data to determine the draft of a water-borne vessel and/or the amount of cargo that has been loaded in a water-borne vessel. The apparatus includes a portable, handheld housing containing means for use in positioning the housing in a predetermined location and spatial orientation. Such means can include one or more narrow beam emitting devices, such as lasers or other similar devices, or a camera or other image processing level sensors. The housing also containing an ultrasonic transducer and receiver, or alternatively, a laser emitter and receiver, that directs sound pulses or light, respectively, toward the surface of the water body in which the vessel is placed. Within the housing is electrical circuitry to receive either the sound or light beam signals, and from these signals produce a signal representative of the time of travel of the sound pulse or light. This signal will be transmitted wirelessly to a PDA or similar device that utilizes an arraying analytical technique on the received signals to determine the distance of the vessel above the waterline. The data representing the distance of the vessel above the waterline will then be either further processed by the PDA, or transmitted wirelessly to a central computer, for use in conjunction with displacement characteristics and cargo unit weight to determine the amount of cargo that has been loaded in the vessel. A collapsible or telescopic handle or other similar device may be attached to the housing to both facilitate carrying the apparatus to the field site, as well as to facilitate the positioning of the housing at the desired draft line while permitting the marine surveyor to stand on the vessel deck. For ease of use controls for operating the apparatus are preferably attachable to the handle.

12 Claims, 6 Drawing Sheets

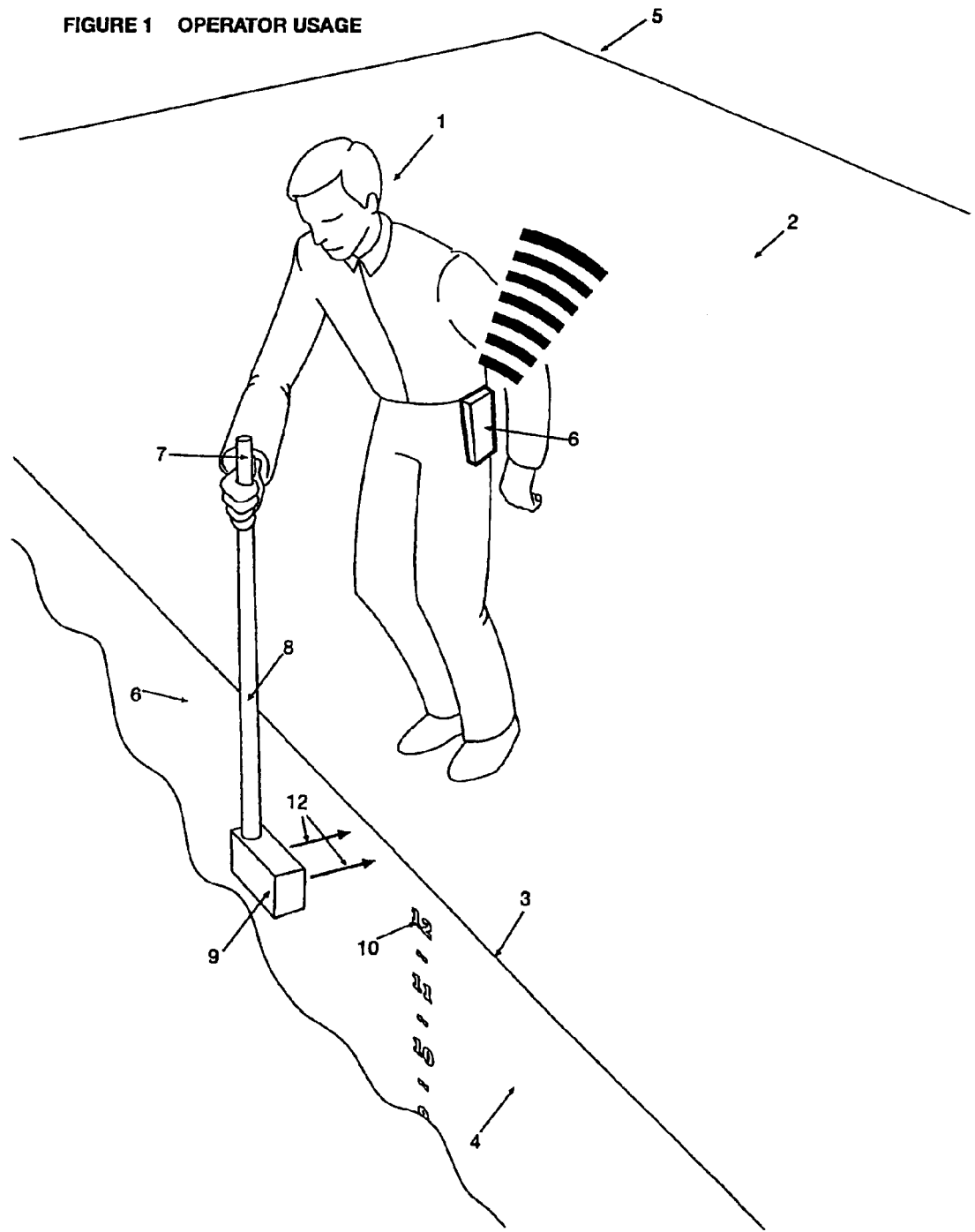

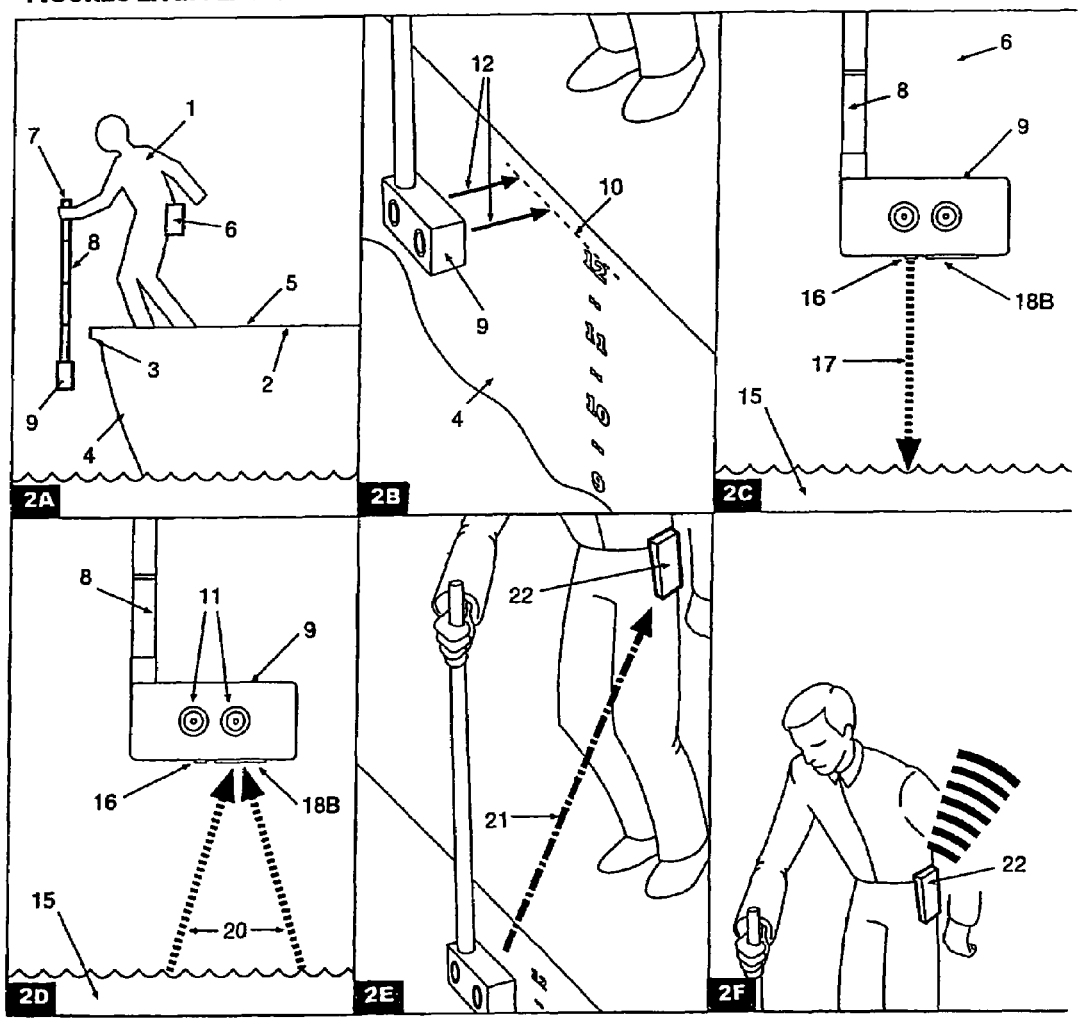

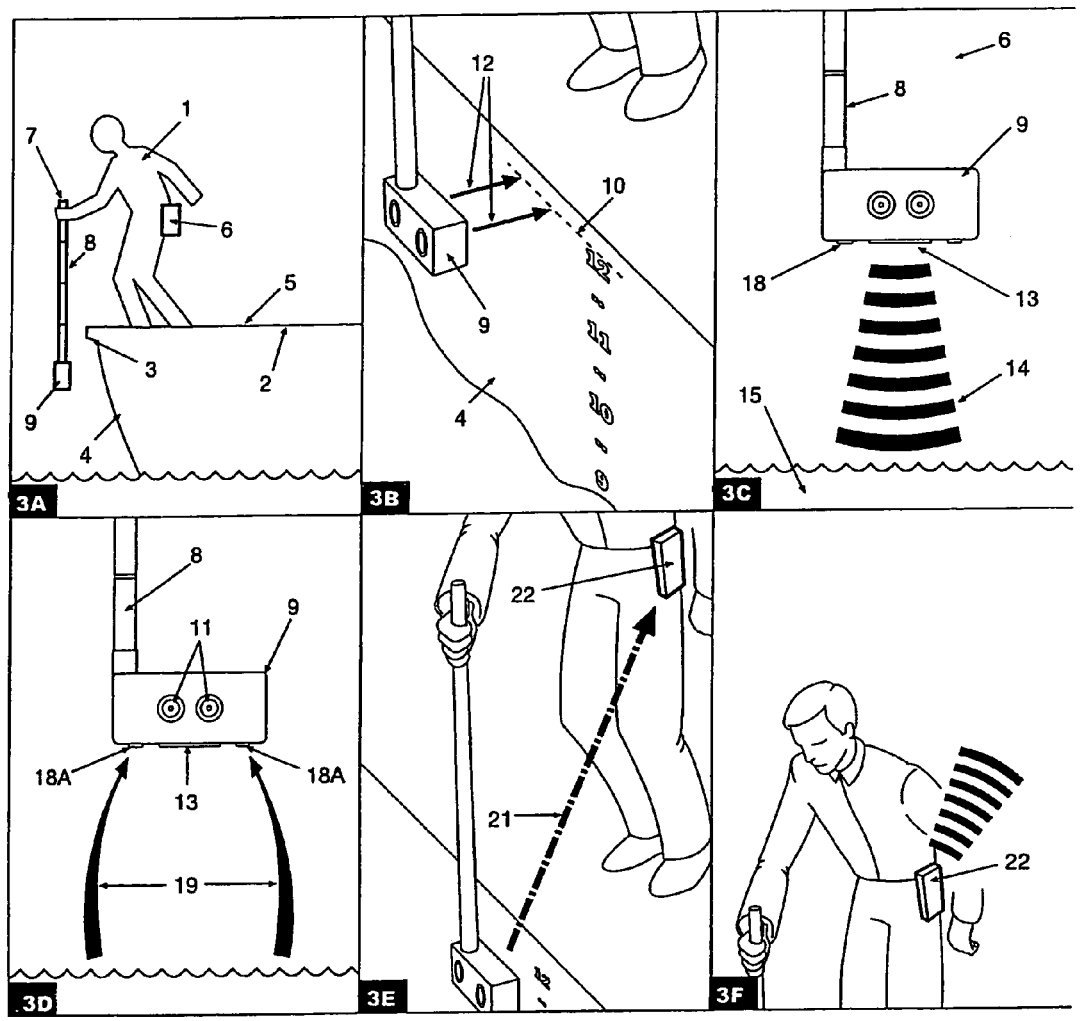

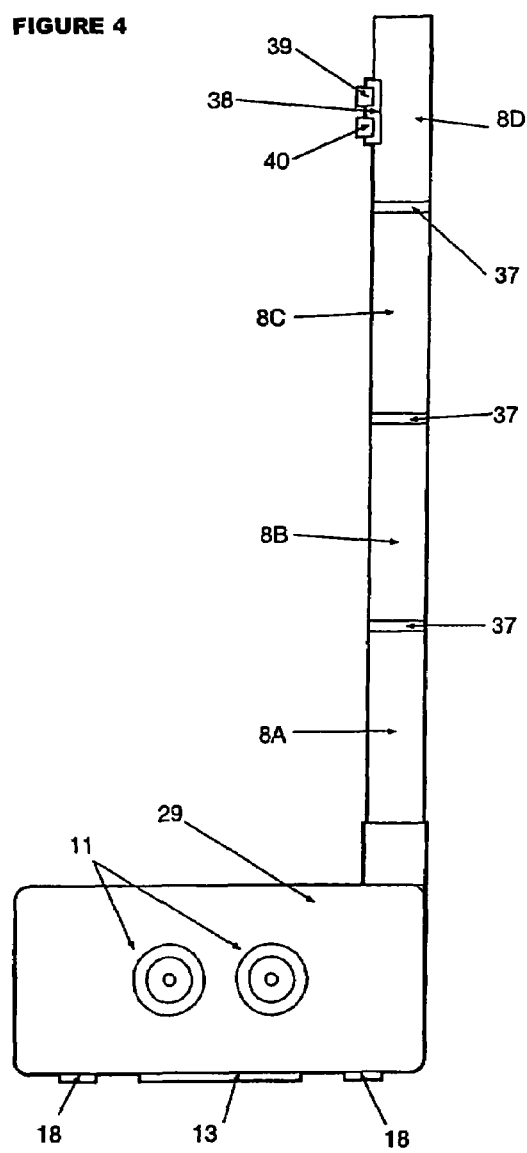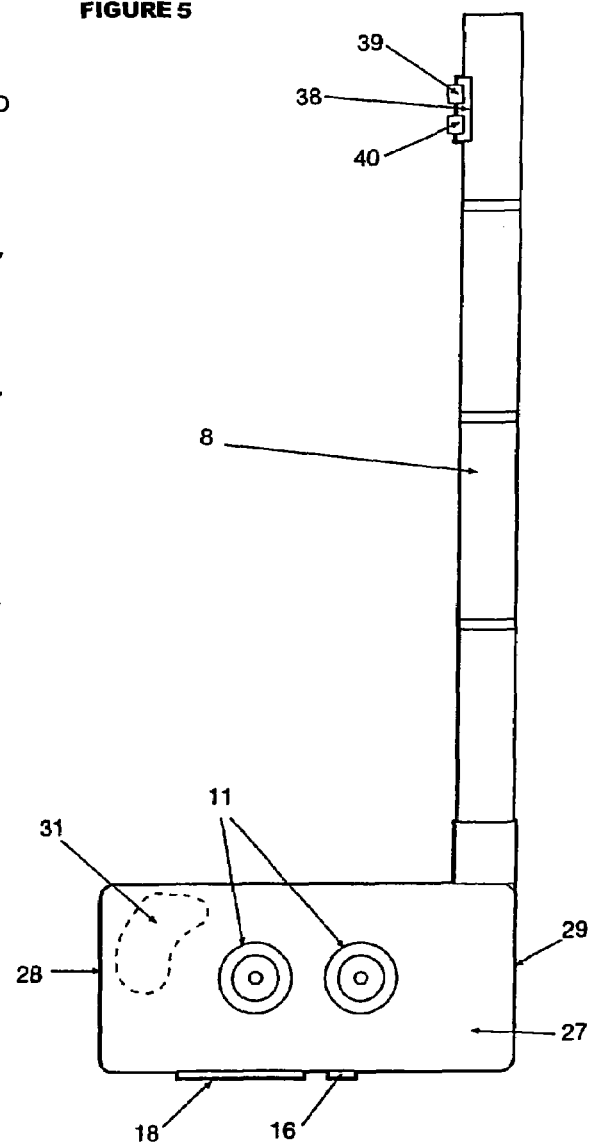

Surveyor Tool System Flowchart

METHODS AND APPARATUS TO DETERMINE VESSEL DRAFT AND AMOUNT OF CARGO LOADED IN A VESSEL

BACKGROUND OF THE INVENTION

1. Field of the Invention

This invention relates in general to methods and apparatus to measure and record data related to the draft of a waterborne vessel and the amount of cargo in the vessel.

2. Prior Art

Water-borne vessels, such as ships and barges, are commonly used to transport cargo utilizing oceans, navigable rivers, canals and lakes. Their ability to carry large amounts of cargo economically makes them particularly suitable for transporting dry bulk cargo, liquid cargo and other similar type cargo that can be loaded by clamshell buckets, conveyors or pumped into the vessel holds. However, to improve the transportation economics, as well as to be able to determine the amount of cargo that has been loaded onto the vessel, it is important to obtain accurate readings of the vessel draft. It is also important to have accurate vessel draft readings to prevent the barge from bottoming out in the waterway during the transporting of the cargo.

Particular problems exist with current barge drafting measurements. In the current system, barge drafters use modified tape measures to obtain a freeboard height using a theoretical distance from the top of the barge to the water level at six set locations around a barge. According to the Barge Surveying Taskforce, a group of individuals put together by the Fertilizer Institute to standardize barge drafting measurements, variations among readings exceed ±3.5% and are seldom repeatable within 0.5% which can lead to a cost variation of over $10,000 per barge.

Freeboard measurements are an attempt to measure the distance from the molded deck down to the water line. Each barge generally has a published depth, which is measured from the deck of the barge to the bottom of the barge. However, during the lifetime of the barge, the decks generally become uneven due to stresses and collisions, making it difficult to find the "true" plane of the barge deck. While there are many problems with the current manual system of barge drafting, most errors can be traced back to one of four main areas. These include inaccurate integration of the measurements to the barge, failure to accurately estimate where the "true" water level due to wave activity, data entry and computational errors resulting from the method of recording the measurements made.

Due to effects that collisions, stress and other factors have on the barge deck, it is difficult to accurately locate the top of the barge for measuring the distance to the top of the water. However, each barge generally has a series of draft numbers permanently attached to the side of the barge adjacent the four corners of a barge. Each block number has a height of exactly six inches and is calibrated from the bottom of the barge. These numbers generally are not affected by stress or collisions. Surveyors use these numbers to establish a zero point where the "true" top of the deck should be located. The use of these numbers as a zero point allows integration into the barge dimensions regardless of the condition of the deck. Other barge drafting systems do not provide for direct integration into the barge draft numbers and work on the assumption that the molded deck has no abnormalities. This assumption is rarely true and the error introduced can throw the calculations off by a number of inches.

The draft of the barge is the distance from the top of the barge deck to the level of the water in which the barge is floating. It is important to establish an accurate water level regardless of the wave activity surrounding a barge. Currently surveyors drop a tape measure down to the water and estimate when the tape's end point is halfway between the peak and valley of the waves intersecting the barge. However, this is simply a visual estimate and can vary a number of inches depending on the surveyor and wave conditions. Conditions typically produce waves in excess of one foot down to an inch in amplitude. Conditions on oceans and rivers can drastically affect the freeboard measurements when compared to readings taken within an area such as a protected port. Furthermore the exact point along the curve of the wave being measured is currently determined by the surveyor which leads to differences amongst surveyor practices. In addition, the poor visibility at the time the measurement is taken can also create problems with the measurement. This is particularly true if one is measuring vessels, such as barges, that are tied up next to one another. In such instances there may only be one inch separating the adjacent vessels which impairs the surveyor's ability to make visual observations regarding the position of the tape measure. Additionally, such measurements can be dangerous if the vessels are rocking due to wave action or other forces. The marine surveyor can slip and fall from the vessel, or in some cases his hand, foot or other body part can get crushed between two vessels that rock into one another.

Surveyors measure the barge drafts at the location of the vessel as it is floating. In many cases, the location of the vessel is an isolated area. The surveyors currently manually write down their freeboard values taken from their tape measure observations. These values are later used for computation and then finally for the final survey report. Thus additional problems occur because of the double entry of the measured distances.

One attempt to obtain more accurate barge draft readings was through positioning of pressure sensors below the water surface of the barge. One such device is described in U.S. Pat. No. 5,547,327 entitled "Method and Apparatus for Continuously Determining the Inclination and Draft of a Waterborne Floating Vessel to Enable Automatic Loading of the Vessel" that issued on Aug. 20, 1996. However, this solution has not found widespread commercial acceptance. Difficulties in positioning the pressure sensors, taking accurate reading of the sensors, analyzing the sensor readings, and the potential of damage to the sensors during transportation are suspected difficulties that still leave the need for more accurate and reliable methods and apparatus to measure barge draft and the amount of cargo loaded in a barge.

Another attempt to solve these industry problems is the use of multiple ultrasonic sensors to determine the barge draft. One such device is described in U.S. Pat. No. 6,836,746 entitled "Method and Apparatus for Calculating the Payload on a Water-Borne Vessel" and issued on Dec. 28, 2004. However, this solution has also not found widespread commercial acceptance. Again difficulties in positioning such sensors and obtaining accurate readings when the vessel is rocking or measuring the draft of vessels that are tied up next to one another where there may only be one inch separating the adjacent vessels still leaves a need in the industry for better methods and apparatus to determine vessel drafts.

OBJECTS AND SUMMARY OF THE INVENTION

Therefore, one object of this invention is to provide an apparatus that can be easily and accurately positioned for use to obtain data to determine a certifiable vessel draft.

Another object of this invention is to provide an apparatus that obtains more accurate and reliable data to determine vessel draft.

Another object of this invention is to provide an apparatus that minimizes errors in barge drafting measurements due to inaccurate integration to the barge, failure to accurately estimate where the "true" water level due to wave activity, computational errors, or data entry errors, as well as create a more reproducible draft value.

A further object of this invention is to provide an apparatus that can be safely used to obtain data to be used for determining vessel draft.

Still another object of this invention is to provide an improved method of obtaining and analyzing data related to vessel draft.

Other objects and advantages of this invention shall become apparent from the ensuing descriptions of the invention.

Accordingly, this invention in one embodiment comprises a method for determining vessel draft including first positioning a surveying device at a first known position relative to a predetermined waterline marker; sending one or more separate signals from the surveying device toward the water body; receiving a reflected signal for each of the signals reflected from the water body; analyzing each of the received reflected signals to determine the vessel draft; positioning the surveying device at a second known position relative to a second predetermined waterline marker; repeating steps above with the surveying device at the second known position; and analyzing all received reflective signals to determine the vessel draft. In a preferred embodiment of this invention the positioning of the surveying device is conducted by perpendicularly aligning a focused light beam, such as emitted by a laser, on one of the upper waterline markers, preferably the upper waterline marker. In another preferred embodiment a visual positioning device, such as camera device that can transmit an image indicating when the camera is aligned with the pre-selected waterline marker. In another preferred embodiment the signals from the surveying device are directed toward the surface of the water body in a direction perpendicular to the focused light beam. In still another preferred embodiment a level can be affixed to the body to indicate that the body is substantially perpendicular to the water surface. In a more preferred embodiment the level will be provided with a transmitter that can emit a sound or electronic signal to indicate when the body is substantially perpendicular to the water surface.

In another embodiment it is preferred that a series of measurements be made over a predetermined time interval at one location on the vessel to permit use of an arraying technique analysis of the measurements to calculate the draft. In another preferred embodiment multiple readings are taken at each position that a vertical series of waterline markers are located.

In another embodiment of this invention a vessel draft surveying device is constructed having a housing, a laser or other focused light beam emitting device is affixed to permit the light beam to be emitted from one side of the housing toward a predetermined waterline marker. Again, known timer circuitry is used to generate a signal representative of the time between the transmitting and receiving of the light beam. In a preferred embodiment the receiving unit is a conventional PDA or PDA-like device. In one embodiment this device can include a computer programmed to be capable of analyzing the time signals to calculate the vessel draft. In a preferred embodiment this program includes an arraying analytical process used to determine the vessel draft. This device can also be provided with a computer chip having preloaded data bases containing the vessel displacement characteristics and cargo unit weight data, or alternatively this data can be transmitted from a central server located off-site to the PDA. The PDA in this embodiment calculates the vessel draft and then transmits the draft calculation to the central computer that is programmed to calculate the amount of cargo loaded in the vessel utilizing the analyzed time signals and the data stored in the central computer database. In another embodiment the PDA can be programmed to calculate both the vessel draft and the amount of cargo loaded in the vessel.

BRIEF DESCRIPTION OF THE DRAWINGS

The accompanying drawings illustrate a preferred embodiment of this invention. However, it is to be understood that these embodiments are not intended to be exhaustive, nor limiting of the invention. They are but examples of some of the forms in which the invention may be practiced.

FIG. 1 illustrates a surveyor standing on the deck of a barge in the process of positioning the measuring device of this invention.

FIGS. 2A-2F illustrate a preferred series of steps used by a marine surveyor to obtain readings with the laser surveying device of this invention for use in calculating barge draft.

FIGS. 3A-3F illustrate a preferred series of steps used by a marine surveyor to obtain readings with the ultrasonic surveying device of this invention for use in calculating barge draft.

FIGS. 4 and 5 are side views of preferred embodiments of the surveying device of this invention illustrating the positioning of aligned lasers.

PREFERRED EMBODIMENTS OF THE INVENTION

Figure 6:
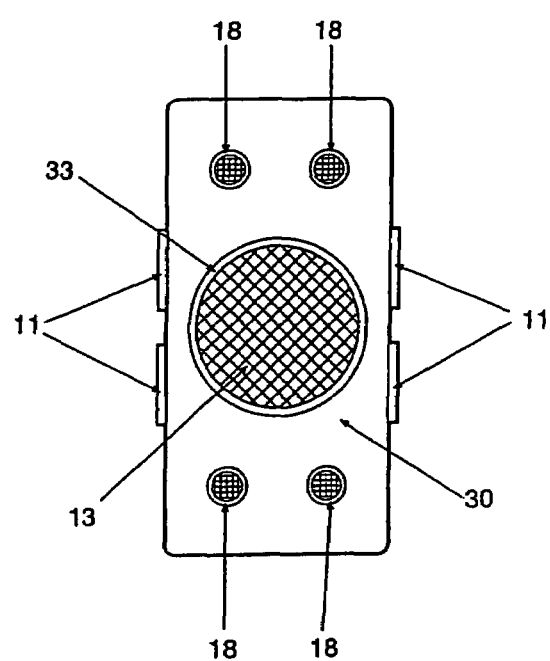
FIG. 6 is a bottom view of FIG. 4 illustrating the use of opposing pairs of alignment lasers to provide additional positioning flexibility of the surveying device, in conjunction with an ultrasonic transducer and microphone receivers for determining the barge draft.

Our system includes an optical indication allowing for the alignment of the tool to the draft numbers. This allows for a more constant integration to the barge, regardless of the condition of the barge deck.

Our system seeks to eliminate this surveyor variance by taking rapid, multiple readings of distances to the water line during the wave action and scientifically computing where the waterline is based on mathematical sampling methods, which is repeatable regardless of the surveyor or water conditions.

Our system contains all needed surveying formulas built into the software for most standard surveying situations. This eliminates the need for any external computations by the surveyors in which errors could be introduced.

Division of Labor, calculations take place on the survey device, the PDA like device, and the server. In most implementations the PDA like device will likely be a windows mobile phone allowing continued access to the main server. This division of labor allows for the simultaneous filtering and real time arithmetic analysis of reading while providing information specific to the job and vessel as well.

Surveying Device, the exact calculations taking place on the surveyor tool depends directly on the embodiment described. In general, the surveyor device determines whether or not to accept a value based upon an internal stored array filtered by inter quartile range. It also samples the reading rate and position of the readings in respect to the surveying positions. The accepted distance values along with the location sampled are then offloaded to through a Bluetooth connection to a PDA like device.

PDA like Device, in the PDA like device, linear regression evaluation of the array is performed as it is built and signals the surveying device when to stop reading. The sampled freeboard values are combined with downloaded barge characteristics. These are combined to allow for calculation of the barge's draft. Barge draft information can be then offloaded onto a central server.

Server, the server is where a finalized barge report is generated. Information such as tank readings and conditions are then added to complete the finalized report.

PREFERRED EMBODIMENTS OF THE INVENTION

Without any intent to limit the scope of this invention, reference is made to the figures in describing the preferred embodiments of the invention.

Referring now to FIG. 1, also in FIGS. 2A-2F and 3A-3F, a marine surveyor 1 is illustrated standing on a barge deck 2 near the edge 3 of one side 4 of the barge 5. The surveyor 1 is shown holding the surveying device 6 used to measure the barge draft (also known as freeboard or ullage) by the upper end 7 of its handle 8 to position the body 9 of the surveying device 6 opposite the desired water line marker 10. The body 9 is provided with one or more focused light beam emitters, such as lasers 11, to assist in the alignment of the body 9 opposite the water line marker 10. Once the light beam 12 is aligned on the water line marker 10, the marine surveyor 1 then activates an ultrasonic transducer 13 to direct a sound wave 14 perpendicularly to the focused light beam 12 and toward the surface 15 of the water. The ultrasonic transducer 13 will also be contained within the body 9 of the surveying device 6. Alternatively, a second laser 16 (see FIG. 5) could be used in place of the ultrasonic transducer 13 to direct a light beam 17 toward the water surface 15. In either case the body 9 will also contain one or more receivers 18 to detect the sound wave 19 or light beam 20 reflected from the water surface 15. Also contained in the body 9 will be conventional electronic timer circuitry (not shown) to generate an elapsed time signal indicative of the elapsed time between the transmission and the receipt of the reflected sound wave 19 or light beam 20 by the receivers 18. In a preferred embodiment the elapsed time signal 21 will be transmitted to a PDA 22 or PDA-type device equipped with WI-FI and/or broad band wireless or other similar electronic assembly that may permit the transmitting of collected data to a main server 41 (see FIG. 9). The PDA is designed to be easily carried by the marine surveyor. In a preferred embodiment multiple elapsed time signals 21 will be generated at each location of a series of vertically positioned waterline markers 10 that are typically positioned on the aft and bow areas of each side of the barge 5. To provide for better analyze of the data it is preferred that measurements be taken at four or more locations and that each location at least six or more measurements be taken. The PDA 22 can be in communicative connection with a main server 41 located at the surveyor's office or at such other location as may be desired. The calculations can take place using a processor located in the surveying device, or in the PDA-like device, or in the on-shore computer. In general the surveying device processor will determine whether or not to accept a value based upon an internal stored array filtered by inter quartile range. It will also sample the reading rate and position of the readings with respect to the surveying positions. In most implementations the PDA-like device will be a windows mobile phone allowing continued access to the main server. In this configuration the accepted distance values along with the location sampled are then offloaded through a Bluetooth connection to a PDA-like device. In a preferred embodiment, the PDA 22 will contain software that permits analysis of the received elapsed time signals 21 to determine the barge draft through the use of linear regression evaluations of the array as it is built. The PDA-like device will signal the surveying device when to stop taking sample readings at a location. The sampled freeboard values are combined with downloaded barge characteristics that can then be used to calculate the barge draft. The barge draft calculation is then transmitted to the main server 41 that has been programmed to calculate the amount of cargo that is contained in the barge 5. This division of computer labor allows for the simultaneous filtering and real time arithmetic analysis of reading while providing information specific to the job and vessel.

The surveying device 6 can be used before, during, and after loading of cargo on the barge 5. The initial draft of a particular barge 5 when unloaded could be measured and this information stored in a database for later comparison against the draft of the same barge 5 when it is loaded. Over time the database will have a valuable knowledge base that may be used in optimizing future operations and prevent extensive damage to barge 5. The database can also be used to determine if barge 5 may have flooded its ballast tanks since the last recording of the data, which can influence the barge draft.

Referring now to FIGS. 4 and 5, surveying device 6 comprises handle 8 and body 9. Handle 8 is preferably collapsible in order to facilitate storage during transport, as well as handling on the job site until the barge draft measurements are to be taken. Handle 8 will be attached at its lower end section 8A to top plate 25 of body 9. It is preferred that handle 8 extend upward from the top plate to permit the marine surveyor 1 to more clearly determine when body 9 has been properly positioned relative to the upper water line marker 10. It is preferred that body 9 having a narrow rectangular profile, such as shown in FIGS. 4 and 5, be constructed having two pairs of opposing side walls 26, 27 and 28, 29, top plate 25 and bottom plate 30 to form a generally box shape having an interior water tight cavity 31. Because the deck edges of adjacent barges can be as close as one inch to one another, it more preferred that the distance between the parallel side walls 26, 27 of body 9 be one inch or less. Side wall 26 will have at least one opening 32 to permit alignment laser 11 to be positioned in the opening 32 in a sealing arrangement permitting the emitting of a narrow light beam 12 perpendicularly from side wall 26. It is preferred that at least two horizontal aligned lasers 11 be used in order to more easily determine that body 9 is horizontally positioned to the waterline marker 10. In a preferred embodiment opposing side wall 27 will also have openings 32 to permit a second pair of horizontal aligned lasers 11 to be positioned to emit narrow light beams 12 perpendicularly from the opposing side wall 27. This permits greater flexibility where the marine surveyor 1 can stand on the barge deck 2, as well as facilitates allowing the marine surveyor 1 to hold handle 8 with either hand.

Figure 7:
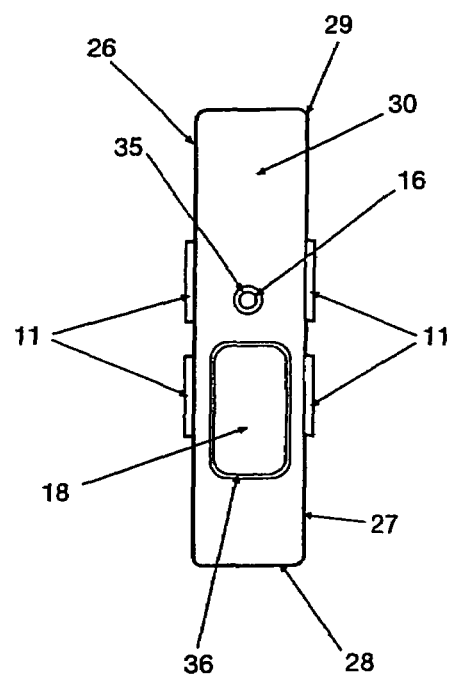
FIG. 7 is alternate view similar to FIG. 6, but wherein the positioning lasers are used in conjunction with a laser emitter and receiver for determining the barge draft.

As illustrated in FIGS. 6 and 7, body bottom plate 30 will be provided with central opening 33 into which ultrasound transducer 13 can be positioned in a sealing arrangement to direct sound wave 14 toward the water surface 15. Body bottom plate 30 will also be provided with one or more openings 34 to accommodate one or more ultrasound microphones 18 that will receive the transmitted sound wave after it has been reflected from the water surface 15. In the alternate embodiment illustrated in FIG. 7, body bottom plate 30 will have opening 35 to accommodate a laser 11 in a sealing arrangement, as well as second opening 36 to accommodate laser receiver 18 in a sealing arrangement. In both embodiments there will be a known electronic timer circuitry operatively attached to the sound or light transmitting devices 13 and 16, respectively, and the reflected sound wave 19 or reflected light receiver 20, respectively, to determine the elapsed time from the transmission to the receipt of the reflected sound wave 19 or light beam 20. The timer circuitry will be operatively connected to a transmitter that receives an elapsed time signal generated by the timer circuitry and transmits an elapsed time signal 21 to the PDA 22 carried by the surveyor 1.

Figure 8:
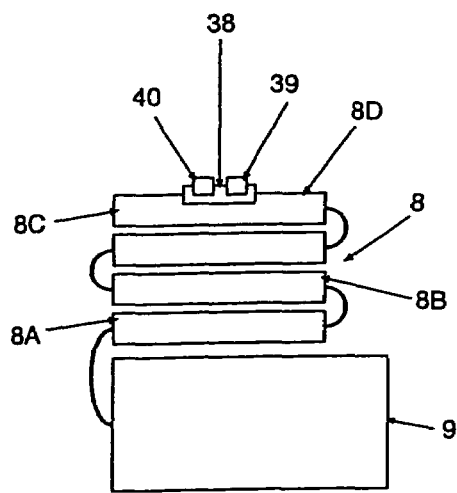
FIG. 8 is a side view of the surveying device handle in a possible collapsed position useful for carrying or transporting to the job site.

As illustrated in FIG. 8, in one preferred embodiment handle 8 will comprise multiple segments of tubing 8A-8D that are attached to adjacent segments by a conventional hinge assembly 37 to permit the tubing segments 8A-8D to be folded on top of one another when the surveying device 6 is not being used. In a preferred embodiment control panel 38 is affixed to the one of the upper segments, preferable the most upper segment 8D. The control panel 38 will contain one or more activation buttons 39 that are operatively connected by wiring 42 to the ultrasonic transmitter 13 or the laser beam transmitter 16 to activate the transmission of the sound wave 14 or laser beam 17, respectively. If desired, control panel 38 can contain other control buttons 40 operatively attached to the transmitter to activate sending the elapsed time signal 21 to the PDA 22. Alternatively, the transmitter can automatically transmit the elapsed time signal 21 to the PDA 22 without any need for activation.

Lower segment 8A of the handle 8 is affixed to top plate 25. In a preferred embodiment lower segment 8A is pivotally affixed to top plate 25 to permit greater flexibility in positioning the body 9 opposite the desired waterline marker 10.

In an alternate embodiment handle segments 8A-8D can be shaped to telescope within one another to form a more compact shape when the surveying device 6 is not in use. In this embodiment it is still preferred that lower segment 8A be pivotally affixed to top plate 25 to permit greater flexibility in positioning the body 9 opposite the desired waterline marker 10. Other known means for compacting a tubular member similar to handle 8 could also be used.

As indicated above the surveying device 6 may utilize ultrasound techniques, laser based measurement techniques or other optical measurement techniques to determine the barge draft. Each measurement technique requires different preprocessing techniques.

DETERMINATION OF BARGE DRAFT USING ULTRASONICS

When utilizing an ultrasonic transducer 13 and receivers 18 it is necessary to analyze the reflected sound wave 19 to identify the echo most likely to represent the water surface 15. An ultrasound echo generally creates a negatively skewed distance distribution where the true reading time value is most likely located in the second quartile (Q2) to the third quartile range (Q3). The mode within variance region between the second and third quartile range is accepted as the valid reading. For this reason, when ultrasound transducer 13 is used, the echoes returned from a single sound pulse are statistically measured within Q3-Q2. This is expressed by the following formula where $y_i$ is the wave amplitude, m is the accepted array.

$$\frac{\sum_{i=1}^{n} y_i}{2} \leq (m) \leq \frac{3\left(\sum_{i=1}^{n} y_i\right)}{4}$$

Determination of Barge Draft using Laser Beam. In the laser-based measurement technique, the preprocessing of echoes is not needed, and therefore readings can be off-loaded directly to the handheld PDA 22 once they have been validated as a non-error produced reading.

In a preferred embodiment the standard deviation of the measured distance y is expressed by the following formula:

$$= \sqrt{\frac{1}{n-1} \sum_{i=1}^{n} \left(y_i - \frac{1}{n}\sum_{i=1}^{n} y_i\right)}$$

The surveying device 6 produces reading values associated with the type and location of the reading until PDA 22 chooses to request additional readings. PDA 22 creates an array double or triple the size of the needed requirement. A sample array is selected from the large reading array by selecting sequential values that minimize b in the equation below.

$$b = -\left[\frac{\frac{1}{2}\left[\sum_{i=1}^{n} y_i^2 - \frac{1}{n}\left(\sum_{i=1}^{n} y_i\right)^2\right] - \left[\sum_{i=1}^{n} x_i^2 - \frac{1}{n}\left(\sum_{i=1}^{n} x_i\right)^2\right]}{\frac{1}{n}\sum_{i=1}^{N} x_i \sum_{i=1}^{N} y_i - \sum_{i=1}^{N} x_i y_i}\right] \pm$$

$$\sqrt{\left[\frac{\frac{1}{2}\left[\sum_{i=1}^{n} y_i^2 - y_n\left(\sum_{i=1}^{n} y_i\right)^2\right] - \left[\sum_{i=1}^{n} x_i^2 - \frac{1}{n}\left(\sum_{i=1}^{n} x_i\right)^2\right]}{\frac{1}{n}\sum_{i=1}^{n} x_i \sum_{i=1}^{n} y_i - \sum_{i=1}^{n} x_i y_i}\right] + 1}$$

The time between readings is expressed as x. This value can shift based on the periodic nature of the waves being vied; however, through experimentation variance in the timing was found to only change the results by less than 0.15 inches. Thus, depending on the accuracy desired may not be necessary.

Once the valid section of the sampled array is captured with a minimized b, the inter-quartile mean is taken of the array after it is sorted. The accepted value can be expressed by the following formula:

$$= \frac{2}{n} \sum_{i=(\frac{n}{4})+1}^{\frac{3n}{4}} x_i$$

FINDING ACCURATE WATER LEVELS. In the surveying device we are looking for a relationship between an array of values with two parts—distance and time. When trying to sample waves using ultrasound in the original test of the system it was found that a majority of readings fell in the inter-quartile range and more specifically Q1-Q2 or Q2-Q3. In fact, the average of the range either Q1-Q2 or Q2-Q3 with the least spread in value represented a repeatable value for the barge freeboard although it is a somewhat incorrect value. It should be noted that the selection of one of these quartile ranges is still present in the ultrasound embodiment of the device. However, in the laser device a simpler inter-quartile range is selected for sampling. Linear regression techniques employed allow for the explanation of the correspondence of the points selected in terms of X and Y values. This correspondence is expressed in a strait line where the line's y intercept and slope b are known.

In a preferred embodiment the surveying device 6 is used to take reading at the following barge locations:

| | | | |
|---|---|---|---|
| Light Port Forward | Light Tank Bow | Heavy Port Forward | Heavy Tank Bow |
| Light Port Mid | Light Tank Port 1 | Heavy Port Mid | Heavy Tank Port 1 |
| Light Port Aft | Light Tank Port 2 | Heavy Port Aft | Heavy Tank Port 2 |
| Light Starboard Forward | Light Tank Port 3 | Heavy Starboard Forward | Heavy Tank Port 3 |
| Light Starboard Mid | Light Tank Port 4 | Heavy Starboard Mid | Heavy Tank Port 4 |
| Light Starboard Aft | Light Tank Port 5 | Heavy Starboard Aft | Heavy Tank Port 5 |
| | Light Tank Starboard 1 | | Heavy Tank Starboard 1 |
| | Light Tank Starboard 2 | | Heavy Tank Starboard 2 |
| | Light Tank Starboard 3 | | Heavy Tank Starboard 3 |
| | Light Tank Starboard 4 | | Heavy Tank Starboard 4 |
| | Light Tank Starboard 5 | | Heavy Tank Starboard 5 |
| | Light Tank Stern | | Heavy Tank Stern |

Figure 9:
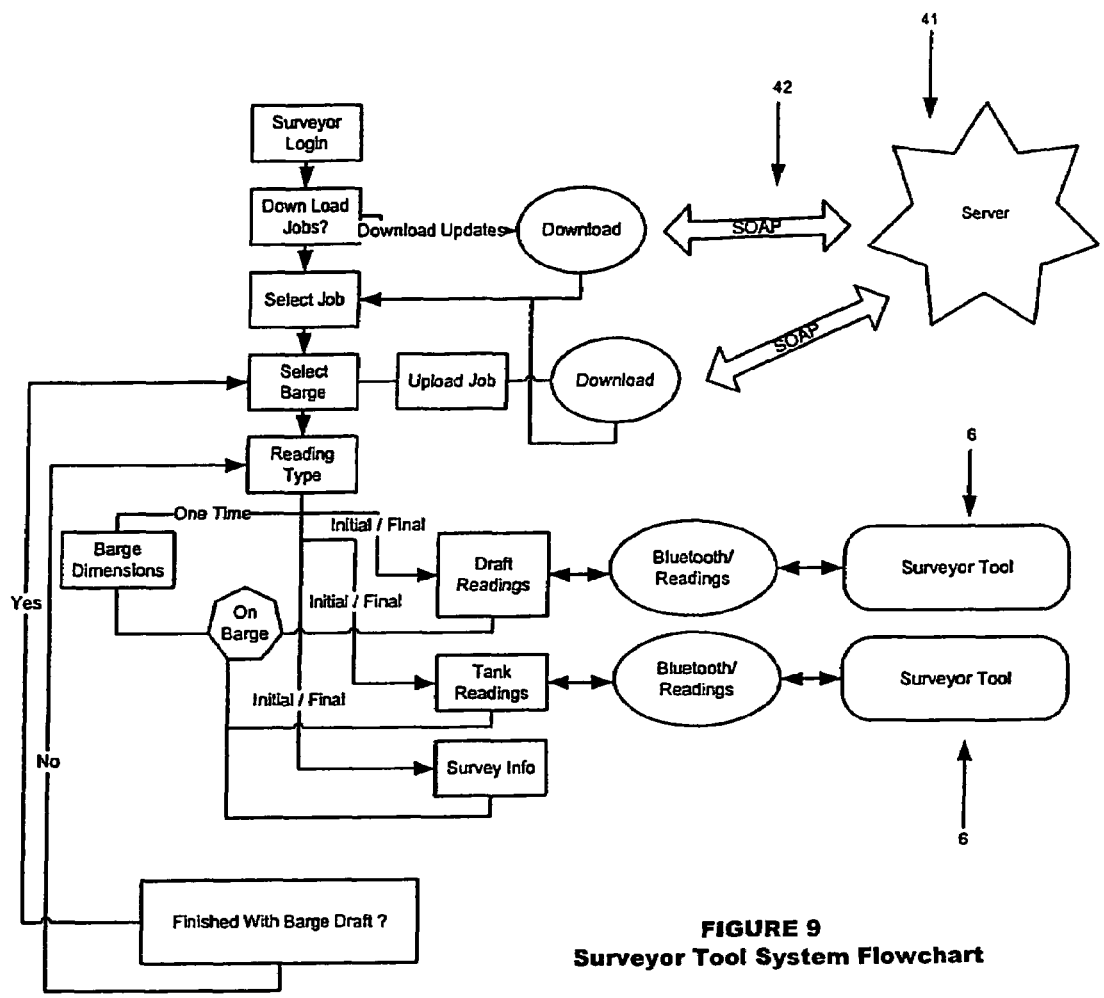
FIG. 9 is a flow chart illustrating the preferred steps taken by the marine surveyor when utilizing one preferred embodiment of the surveying device of this invention in conjunction with a PDA and a main server.

The flow chart in FIG. 9 illustrates the interaction permitted by the software loaded in PDA 22 between the surveying device 6 and the PDA 22. Surveyor 1 activates PDA 22 and logs in. The surveyor 1 selects the first barge 5 to be surveyed. Main server 41 will then transmit information related to the barges that are to be surveyed. The following information is typical of the known information. This information from the barge database in the main server 41 is transmitted to PDA 22 or a PDA-like device through a standard SOAP connection.

Barge readings are then obtained by the marine surveyor 1 and are returned from PDA 22 or PDA-like device to main server 41. Main server 41 then uses the following series of formula to calculate the total tonnage of cargo loaded in barge 5 wherein:

$\alpha$=Light Draft $\beta$=Loaded Draft $\chi$=Hull Depth $\delta$=Hull Length $\varphi$=Distance from headlog to end of rake shear $\phi$=Rake Headlog Height $\gamma$=Distance from Aft readings to Stern $\eta$=Distance from end of deck shear to Forward Mark $\iota$=Light measured Freeboard at headlog $\kappa$=Deck to rack bottom at Aft edge of Manhole $\lambda$=Distance from headlog to Aft edge of manhole $$\xi = \left( \frac{\frac{(IPA+ISA)}{2} - \frac{(IPF+ISF)}{2}}{\delta - \gamma - \eta - \phi} \right)$$

$$\rho = \left( \frac{\frac{FPA+FSA}{2} - \frac{FPF+FSG}{2}}{\delta - \gamma - \eta - \phi} \right)$$

-continued $$\omega = \frac{\left(\chi - \left(\frac{IPF+ISF}{2} - (\xi*\phi)\right)\right) + \iota - \varphi - \left(\chi - \left(\kappa - \left(\frac{\iota + \left(\left(\chi - \left(\frac{IPF+ISF}{2} - (\xi*\phi)\right)\right) + \iota\right) - \chi}{\phi} * (\phi - \lambda)\right)\right)\right)}{(\lambda)}$$

$$\psi = \chi - \frac{IPF+ISF}{2}$$

$$\zeta = \chi - \frac{FPF+FSF}{2}$$

$$\upsilon = (\phi - \lambda) - \frac{\left(\chi - \left(\kappa - \left(\frac{\iota + \left(\left(\chi - \left(\frac{IPF+ISF}{2} - (\xi*\phi)\right)\right) + \iota\right) - \chi}{\phi} * (\phi - \lambda)\right)\right)\right)}{\omega}$$

$$\text{Displacement Tonnage} = \frac{\left(\left(\frac{\left(\frac{\left(\frac{\psi}{\omega}\right) + \upsilon}{\left(1 - \frac{\xi}{\omega}\right)}\right) + \left(\frac{\left(\frac{\zeta}{\omega}\right) + \upsilon}{\left(1 - \frac{\rho}{\omega}\right)}\right)}{2}\right) + (\delta - \phi)\right) * (\beta - \alpha)}{2000} * \chi * 62.43$$

Wherein:
IPA=Initial Port Aft
ISA=Initial Starboard Aft
IPF=Initial Port Forward
ISF=Initial Starboard Forwards
FPA=Final Port Aft
FSA=Final Starboard Aft
FPF=Final Port Forward
FSF=Final Starboard Forward
.=Y Intercept Heavy
Λ=X Intercept of Rake Equation
Δ=Heavy Trim Factor
>=Light Trim Factor
P=Y Intercept Light There are of course other alternate embodiments that are obvious from the foregoing descriptions of the invention which are intended to be included within the scope of the invention as defined by the following claims.

What we claim is:

1. An apparatus for measuring barge draft of a barge for transporting a cargo having a known cargo unit weight, the barge having known displacement characteristics and having one or more waterline markers affixed to at least one side of the barge, at least one of the waterline markers being visible when the barge is floating in a water body comprising:
   (a) a housing;
   (b) a first means affixed to the housing for indicating when the housing is positioned opposite a predetermined one of the waterline markers;
   (c) a second means affixed to the housing for transmitting and receiving a signal reflected from the surface of the water body;
   (d) a timer affixed to the second means for measuring time between the transmitting and the receiving of the signal, and for transmitting a time signal indicative of the measured time; and
   (e) a third means operatively attached to the time for receiving the time signal and for calculating the barge draft from the time signal.

2. An apparatus according to claim 1 further comprising a collapsible handle affixed at a first end section to the housing constructed and size to position the first means opposite the predetermined one of the waterline markers.

3. An apparatus according to claim 2 wherein means for activating the first means and the second means is affixed to a second end section of the handle, the second end section being opposite the first end section.

4. An apparatus according to claim 1 wherein the first means is a light source that generates and transmits a light beam.

5. An apparatus according to claim 4 wherein the light source is a laser.

6. An apparatus according to claim 1 wherein the second means comprises an ultrasonic transducer and receiver or a laser beam emitter and receiver.

7. An apparatus according to claim 6 wherein the third means comprises one or more computers that have stored in databases the displacement characteristics of the barge and the cargo unit weight, the one or more computer receiving the time signal, the one or more computer calculating the total cargo in the barge from the time signal, and the displacement characteristics of the barge and the cargo unit weight stored in the databases.

8. An apparatus for determining the total amount of cargo in a barge for transporting a cargo having a known cargo unit weight, the barge having known displacement characteristics and having one or more series of waterline markers affixed to at least one set of opposite sides of the barge, at least one of the waterline markers in each series of waterline markers being visible when the barge is floating in a water body comprising:

(a) a housing;

(b) a first means affixed to the housing for directing a light beam perpendicularly from the housing;

(c) a second means affixed to the housing for transmitting a signal perpendicular to the light beam and toward the water body, and for receiving the signal reflected from the water body;

(d) a timer assembly operatively affixed to the second means for determining the time between the transmitting of the signal and the receiving of the signal reflected from the water body; the time assembly constructed to transmit a time indicator signal reflective of the time; and (e) one or more computers constructed to receive the time indicator signal, the one or more computers have the barge displacement characteristics and the cargo unit weight stored in one or more databases, the one or more computers utilizing data comprising the time indicator signal, the barge displacement characteristics and the cargo unit weight to determine the total amount of cargo in the barge.

9. An apparatus according to claim 8 wherein said second means is a transducer or laser and wherein the second means transmits at different known time intervals a signal perpendicular to the light beam and toward the water body and discriminatorily receives each of the transmitted signals reflected from the water body; wherein the timer assembly for each received signal determines a corresponding time between the transmitting of the signal and the receiving of the signal reflected from the water body, the time assembly constructed to transmit for each corresponding time a corresponding time indicator signal; and the one or more computers constructed to receive each corresponding time indicator signals, the one or more computers having an arraying program to calculate a representative time indicator signal, and the one or more computers determining the total amount of cargo in the barge from data comprising the representative time indicator signal, the barge displacement characteristics and the cargo unit weight.

10. A method for determining barge draft of a barge having one or more waterline markers and floating in a water body comprising:

(a) positioning a surveying device at a first known position relative to a predetermined barge waterline maker;

(b) sending one or more separate signals from the surveying device toward the water body;

(c) receiving a reflected signal for each the signal reflected from the water body;

(d) analyzing each of the received reflected signal to determine the barge draft;

(e) positioning the surveying device at a second known position relative to a second predetermined barge waterline maker;

(f) repeating steps (b)-(d) with the surveying device at the second known position; and (g) Analyzing all received reflective signals to determine the barge draft.

11. A method according to claim 10 wherein the first known position is one side of the barge and the second known position is on the opposite side of the barge.

12. A method according to claim 11 wherein the one or more computers determines the total amount of cargo in the barge from the barge draft, the displacement characteristics of the barge and the cargo unit weight.

* * * * *